(12) United States Patent
Abasolo et al.

(10) Patent No.: US 9,416,773 B2
(45) Date of Patent: Aug. 16, 2016

(54) POWER GENERATION AND DISTRIBUTION SYSTEM FOR A WIND TURBINE

(75) Inventors: Patxi Mendizabal Abasolo, Sarriguren (ES); Andre Roche, Pittsburg, PA (US)

(73) Assignee: GAMESA INNOVATION & TECHNOLOGY, S.L., Sarriguren (Pamplona) (ES)

( * ) Notice: Subject to any disclaimer, the term of this patent is extended or adjusted under 35 U.S.C. 154(b) by 747 days.

(21) Appl. No.: 13/439,307

(22) Filed: Apr. 4, 2012

(65) Prior Publication Data

US 2013/0264882 A1     Oct. 10, 2013

(51) Int. Cl.
| | | |
|---|---|---|
| *G01T 1/164* | (2006.01) | |
| *G01T 1/166* | (2006.01) | |
| *H01L 31/18* | (2006.01) | |
| *F03D 9/00* | (2016.01) | |
| *H02J 3/38* | (2006.01) | |

(52) U.S. Cl.
CPC ............... *F03D 9/003* (2013.01); *H02J 3/386* (2013.01); *F05B 2220/70644* (2013.01); *F05B 2220/70646* (2013.01); *Y02E 10/725* (2013.01); *Y02E 10/726* (2013.01); *Y02E 10/763* (2013.01); *Y10T 307/696* (2015.04)

(58) Field of Classification Search
CPC ... F03D 9/003; F05B 2240/95; Y02E 10/725; Y02E 10/726
USPC . 307/17; 290/4 R, 4 A, 4 B, 4 C, 40 R, 40 A, 290/44, 55
See application file for complete search history.

(56) References Cited

U.S. PATENT DOCUMENTS

| | | | |
|---|---|---|---|
| 7,298,055 B2 | 11/2007 | Galloway et al. | |
| 8,188,610 B2* | 5/2012 | Scholte-Wassink | 290/44 |
| 2007/0052241 A1* | 3/2007 | Pacy | 290/1 R |
| 2009/0021963 A1* | 1/2009 | Andresen et al. | 363/37 |
| 2009/0134625 A1* | 5/2009 | Altenschulte | F03D 11/00 290/44 |
| 2009/0302608 A1* | 12/2009 | Andresen | 290/44 |
| 2011/0106470 A1* | 5/2011 | Yin et al. | 702/58 |
| 2011/0109085 A1* | 5/2011 | Nelson | 290/44 |
| 2011/0134574 A1* | 6/2011 | Ritter | 361/21 |
| 2011/0175355 A1* | 7/2011 | Rosenvard | 290/44 |
| 2012/0146423 A1* | 6/2012 | Bodewes et al. | 307/84 |
| 2012/0217824 A1* | 8/2012 | Gupta et al. | 307/145 |
| 2013/0229056 A1* | 9/2013 | Teichmann | 307/18 |

FOREIGN PATENT DOCUMENTS

| | | |
|---|---|---|
| JP | 2003061396 A | 2/2003 |
| WO | 2010/031575 A2 | 3/2010 |

OTHER PUBLICATIONS

Arana et al., Energization of Wind Turbine Transformers with an Auxilary Generator in a Large Offshore Wind Farm During Islanded Operations, IEEE Transactions on Power Delievery, vol. 26, Oct. 4, 2011, 9 pages.

* cited by examiner

*Primary Examiner* — Jared Fureman
*Assistant Examiner* — Aqeel Bukhari
(74) *Attorney, Agent, or Firm* — Maier & Maier, PLLC

(57) ABSTRACT

A power distribution system for a wind turbine having a base and a nacelle, the wind turbine being coupled to a power grid. The system can include a main power circuit, the main power circuit including a generator, a main power transformer, and a first current interrupter. The system can further include an auxiliary circuit, the auxiliary circuit including a second current interrupter, an auxiliary transformer, and at least one auxiliary component, and a junction coupled to the main power circuit, the auxiliary circuit, and the power grid.

12 Claims, 4 Drawing Sheets

POWER GENERATION AND DISTRIBUTION SYSTEM FOR A WIND TURBINE

BACKGROUND

In recent years, wind turbines have increased in popularity as a means of electrical power generation. Wind turbines offer the advantages of relatively inexpensively generating power from a renewable energy source as well as having a low impact on the surrounding environment.

The electrical system of a wind turbine typically includes several power systems. The main power system includes the circuits and components which connect the wind turbine generator to the electrical power grid, while the auxiliary power system (also known as the low voltage distribution system) provides power to auxiliary components such as lights, security systems, electronic controls, climate controls, motors, and so forth. Typically, the auxiliary power system is fed by an auxiliary transformer which connected between the power converter and the main power transformer. In systems utilizing a doubly-fed induction generator (DFIG) and excitation converter, the auxiliary power system is typically fed by an auxiliary transformer connected between the junction of the DFIG and excitation converter, and the main power transformer.

When the turbine is generating power, the auxiliary power system is powered by the electricity generated by the wind turbine. Conversely, when the turbine is not generating power, auxiliary power is still required to monitor the electrical system, as well as to power the auxiliary components. In such situations, power is provided to the auxiliary system by back-feeding electricity from the electrical power grid.

When maintenance personnel need to perform work on the wind turbine, the generator is shut down and main power transformer is disconnected from the electrical power grid. This de-energizes the power generating system between the turbine generator and the power grid, thereby eliminating the risk of electric shocks from energized wires, assemblies, or components in the nacelle. However, as a result, no power remains available to feed the auxiliary systems of the wind turbine. A solution for powering the auxiliary systems of a wind turbine while the main transformer is disconnected from the power grid is therefore desired.

SUMMARY

According to at least one exemplary embodiment, a power distribution system for a wind turbine may be disclosed. The turbine can include a base and a nacelle, and can be coupled to a power grid. The system can include a main power circuit, the main power circuit including a generator, a main power transformer, and a first current interrupter. The system can further include an auxiliary circuit, the auxiliary circuit including a second current interrupter, an auxiliary transformer, and at least one auxiliary component, and a junction coupled to the main circuit, the auxiliary circuit, and the power grid.

According to another exemplary embodiment, a method for wind turbine power distribution may be disclosed. The method can include providing a main power circuit, the main power circuit including a generator, a main transformer, and a first current interrupter. The method can further include providing an auxiliary circuit, the auxiliary circuit comprising a second current interrupter, an auxiliary transformer, and at least one auxiliary component, coupling the main circuit and the auxiliary circuit at a junction, and coupling the junction to the power grid. The method can further include isolating the main circuit from the power grid and providing power to the auxiliary circuit from the power grid.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
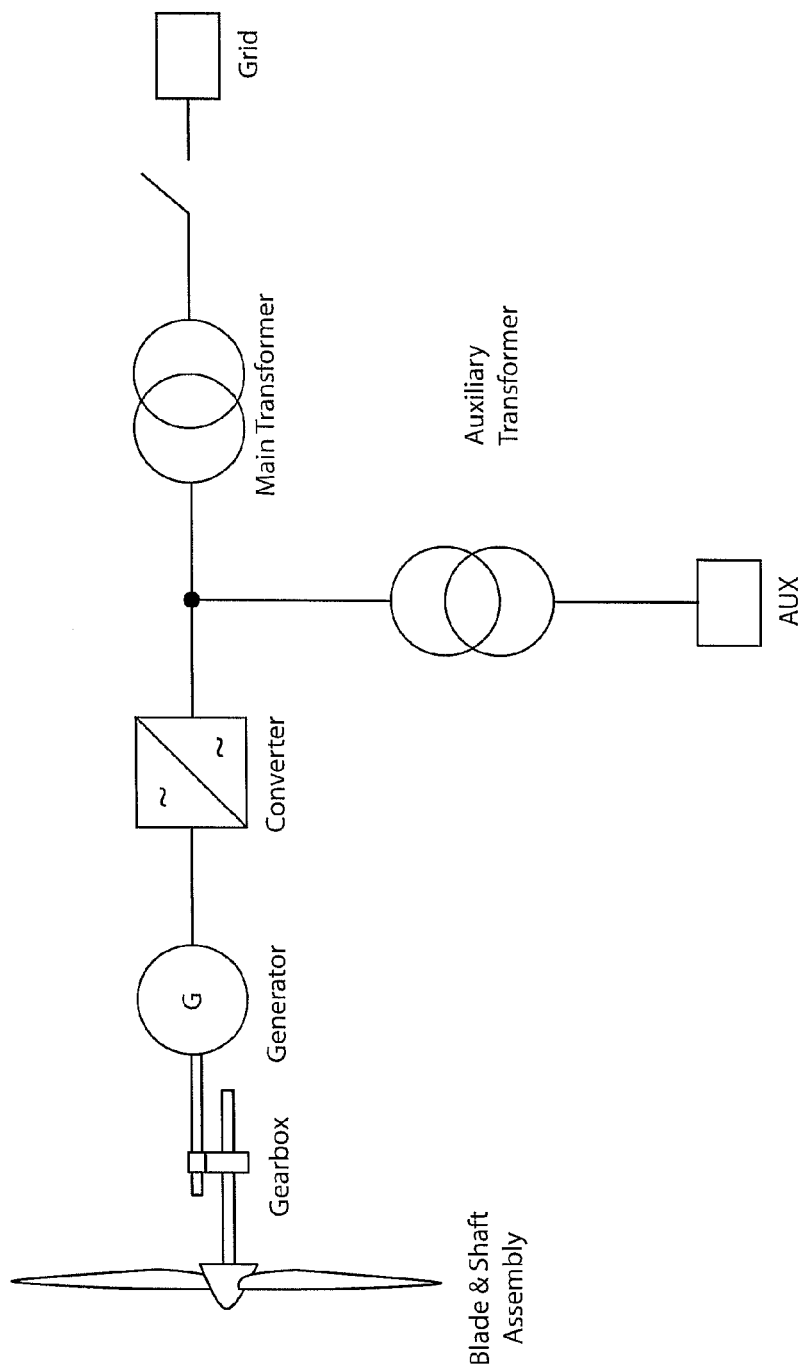
FIG. 1 shows an exemplary prior art power distribution system.
Figure 2:
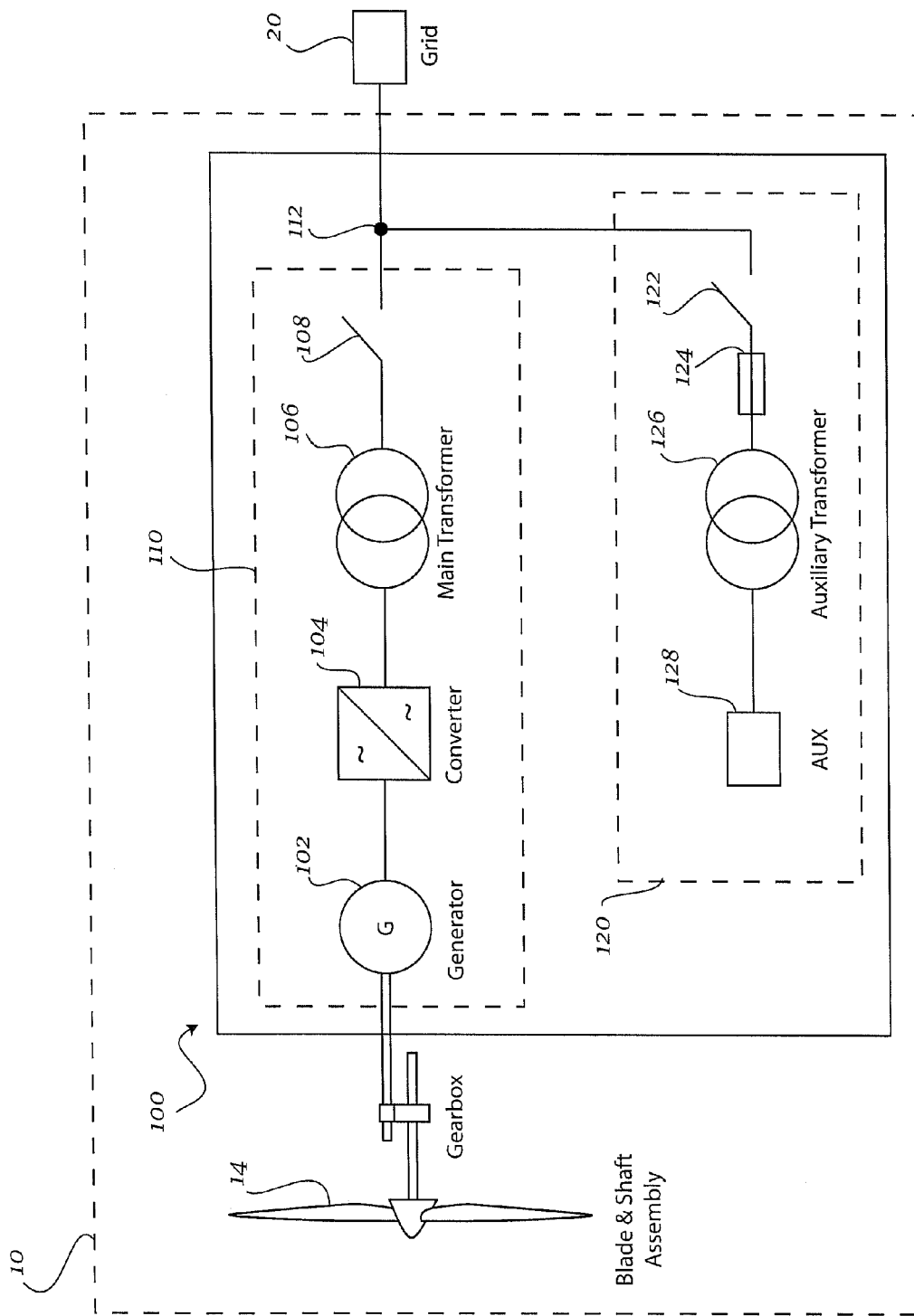
FIG. 2 shows an exemplary embodiment of a power distribution system for a wind turbine.
Figure 3:
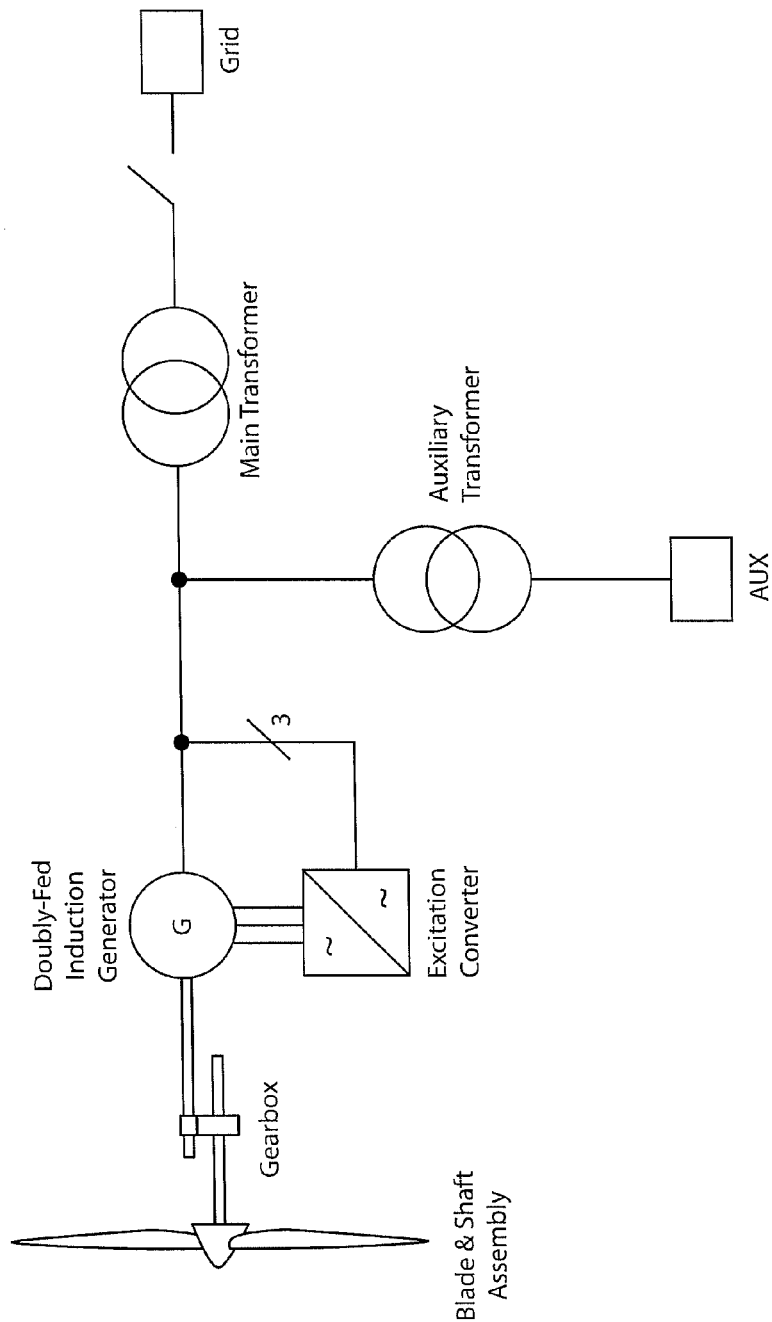
FIG. 3 shows an exemplary prior art power distribution system including a doubly-fed induction generator.

According to one exemplary embodiment, as shown in FIG. 2, a power generation and distribution system 100 for a wind turbine may be disclosed. System 100 may include a generator 102, which can be operatively coupled to the blade and shaft assembly 14 of a wind turbine 10. If generator 102 is an asynchronous alternating current (AC) generator, then generator 102 may further be electrically coupled to a power converter 104, which may be a four-quadrant power converter, or any other known asynchronous AC to synchronous AC conversion device that enables system 100 to function as described herein. Converter 104 may in turn be coupled to a main power transformer 106. Transformer 106 may be any known transformer type that enables system 100 to function as described herein.

Transformer 106 may be connected to power grid 20 via a first current interrupter 108. First current interrupter 108 may function as the main circuit breaker of wind turbine 10. First current interrupter 108 may further incorporate multi-functional relay protective elements therein, such as, for example, overcurrent relays, time-overcurrent relays, ground-overcurrent relays, circuit breakers, and any other desired protective elements. Components 102, 104, 106, and 108 may constitute a main power circuit 110 of wind turbine 10.

Disposed between first current interrupter 108 and the connection to power grid 20 may be a junction 112. Junction 112 may be electrically coupled to both main power circuit 110 and an auxiliary circuit 120.

Auxiliary circuit 120 may include a second current interrupter 122, a protective element 124, an auxiliary transformer 126, and auxiliary components 128. Second current interrupter 122 may be any type of switch known in the art that enables system 100 to function as described herein. Protective element 124 may be disposed between, and coupled to each of second current interrupter 122 and auxiliary transformer 126. Protective element 124 may be, for example, a fused protective element. In some exemplary embodiments, second current interrupter 122 and protective element 124 may be combined, for example as a fused switch, circuit breaker or the like.

The auxiliary transformer 126 may be any desired type of transformer known in the art, may have a power rating that is suitable for powering the auxiliary components 128 of wind turbine 10, and any desired voltage and power capacity for auxiliary transformer 126 may be contemplated and provided. Auxiliary transformer 126 may further be coupled to auxiliary components 128 of wind turbine 10.

When turbine 10 is in regular operation, main circuit 110 may be energized and connected to power grid 20 by way of first current interrupting element 108, and electrical power may be provided from generator 102 to power grid 20. Furthermore, in regular operation, auxiliary circuit 120 may be energized and connected to junction 112 by way of second current interrupting element 122. Electrical power can thus be provided from generator 102 to auxiliary components 120, with the electrical power from main power transformer 106 being converted to the appropriate voltage by auxiliary transformer 126.

During maintenance operations, generator 102 may be shut down, and main circuit 110 may be isolated from power grid 20. This can de-energize the wiring, assemblies, and components of main circuit 110, thereby reducing the risk of electrocution during maintenance operations. However, when main circuit 110 is isolated, auxiliary circuit 120 may remain connected to power grid 20 by way of junction 112 and second current interrupting element 122. Power can thus be back-fed from grid 20 to auxiliary transformer 126, and to the auxiliary components 128 of wind turbine 10. This can facilitate maintaining auxiliary systems such as lights, security systems, electronic controls, climate controls, motors, and so forth energized, thereby assisting personnel during maintenance operations.

Additionally, the power distribution system 100 disclosed herein can provide for lower inrush currents when energizing the wind turbine auxiliary systems from a stand-by generator, as the inrush current to auxiliary transformer 126 can be lower than the inrush current to main transformer 106.

Figure 4:
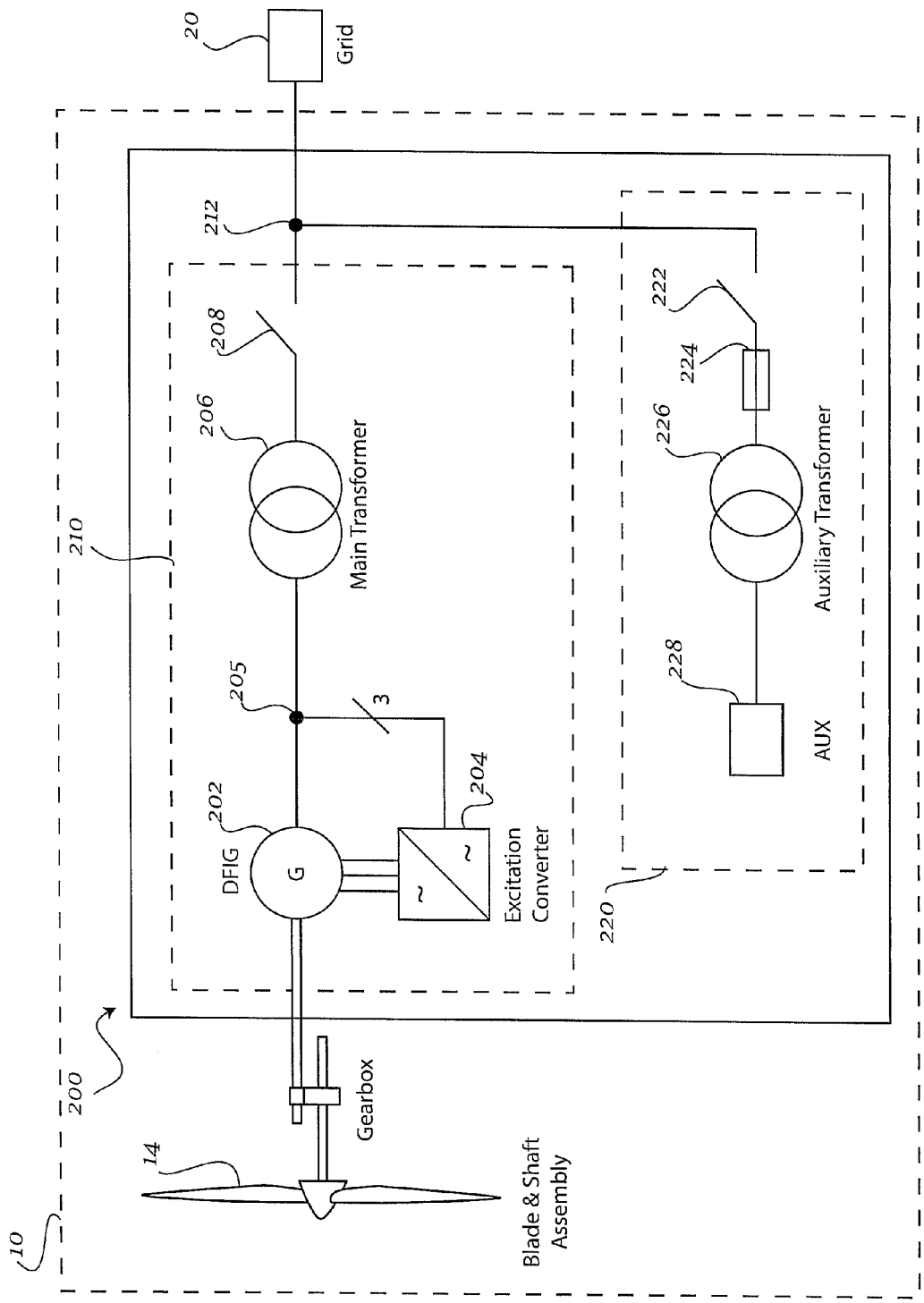
FIG. 4 shows an exemplary embodiment of a power distribution system for a wind turbine, including a doubly-fed induction generator.

According to one exemplary embodiment, as shown in FIG. 4, a power distribution system 200 for a wind turbine may be disclosed. System 200 may include a doubly-fed induction generator 202, which can be operatively coupled to the blade and shaft assembly 14 of a wind turbine 10. DFIG 202 may further be electrically coupled to an excitation converter 204, which may be any known excitation converter that enables system 200 to function as described herein. DFIG 202 and converter 204 may in turn be coupled to a main power transformer 206 via a junction 205. Transformer 206 may be any known transformer type that enables system 200 to function as described herein.

Transformer 206 may be connected to power grid 20 via a first current interrupter 208. First current interrupter 208 may function as the main circuit breaker of wind turbine 10. First current interrupter 208 may further incorporate multi-functional relay protective elements therein, such as, for example, overcurrent relays, time-overcurrent relays, ground-overcurrent relays, circuit breakers, and any other desired protective elements. Components 202, 204, 206, and 208 may constitute a main circuit 210 of wind turbine 10.

Disposed between first current interrupter 208 and the connection to power grid 20 may be a junction 212. Junction 212 may be electrically coupled to both main power circuit 210 and an auxiliary circuit 220.

Auxiliary circuit 220 may include a second current interrupter 222, a protective element 224, an auxiliary transformer 226, and auxiliary components 228. Second current interrupter 222 may be any type of switch known in the art that enables system 200 to function as described herein. Protective element 224 may be disposed between, and coupled to each of second current interrupter 222 and auxiliary transformer 226. Protective element 224 may be, for example, a fused protective element. In some exemplary embodiments, second current interrupter 222 and protective element 224 may be combined, for example as a fused switch, circuit breaker, or the like.

The auxiliary transformer 226 may be any desired type of transformer known in the art, may have a power rating that is suitable for powering the auxiliary components 228 of wind turbine 10, and any desired voltage and power capacity for auxiliary transformer 226 may be contemplated and provided. Auxiliary transformer 226 may further be coupled to auxiliary components 228 of wind turbine 10.

When turbine 10 is in regular operation, main power circuit 210 may be energized and connected to power grid 20 by way of first current interrupting element 208, and electrical power may be provided from DFIG 202 to power grid 20. Furthermore, in regular operation, auxiliary circuit 220 may be energized and connected to junction 212 by way of second current interrupting element 222. Electrical power can thus be provided from DFIG 202 to auxiliary components 220, with the electrical power from main power transformer 206 being converted to the appropriate voltage by auxiliary transformer 226.

During maintenance operations, DFIG 202 may be shut down, and main power circuit 210 may be isolated from power grid 20. This can de-energize the wiring, assemblies, and components of main circuit 210, thereby reducing the risk of electrocution during maintenance operations. However, when main circuit 210 is isolated, auxiliary circuit 220 may remain connected to power grid 20 by way of junction 212 and second current interrupting element 222. Power can thus be back-fed from grid 20 to auxiliary transformer 226, and to the auxiliary components 228 of wind turbine 10. This can facilitate maintaining auxiliary systems such as lights, security systems, electronic controls, climate controls, motors, and so forth energized, thereby assisting personnel during maintenance operations.

Additionally, the power distribution system 200 disclosed herein can provide for lower inrush currents when energizing the wind turbine auxiliary systems from a stand-by generator, as the inrush current to auxiliary transformer 226 can be lower than the inrush current to main transformer 206.

In some exemplary embodiments of the systems 100, 200 disclosed herein, certain components of the system may be disposed within the nacelle of the turbine or the base of the turbine as desired. As a non-limiting example, in some embodiments, the auxiliary transformer and any other desired components, may be disposed at the base of the turbine. This can facilitate reducing weight in the nacelle of the wind turbine thereby increasing space and decreasing waste heat output in the nacelle. This can provide for increased safety as well as improved access to the components disposed in the nacelle. In other exemplary embodiments, the components of the system may be disposed in the nacelle of the turbine, or any other desired location that enables the system to function as disclosed herein.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A power distribution system for a wind turbine having a base and a nacelle, the wind turbine being coupled to a power grid, comprising a main power circuit, the main power circuit comprising a generator, a main power transformer, and a first current interrupter, an auxiliary circuit, the auxiliary circuit comprising a second current interrupter, an auxiliary transformer and at least one auxiliary component of the wind turbine; and a junction coupled to the main power circuit, the auxiliary circuit, and the power grid, the generator being coupled to the blade and shaft assembly of the wind turbine, the main power transformer being coupled to the generator, the main power transformer being coupled to the power grid via the first current interrupter, the auxiliary transformer being coupled to the power grid via the second current interrupter, wherein the auxiliary transformer is coupled to the power grid at a junction disposed between the power grid and the first current interrupter, wherein when the main power transformer is coupled to the power grid via the first current interrupter, electrical power is provided from the generator to the power grid and to the at least one auxiliary component, and wherein when the main power transformer is isolated from the power grid to the auxiliary transformer and to the at least one auxiliary component via the second current interrupter.

2. The system of claim 1, further comprising a power converter disposed between the generator and the main power transformer.

3. The system of claim 1, wherein the first current interrupter incorporates protective elements therein.

4. The system of claim 1, further comprising a protective element disposed between the auxiliary transformer and the second current interrupter.

5. The system of claim 1, wherein the second current interrupter is one of a fused switch and a circuit breaker.

6. The system of claim 1, wherein the generator is a doubly-fed induction generator.

7. The system of claim 1, wherein the auxiliary transformer is disposed at the base of the turbine.

8. A method for wind turbine power distribution, comprising:
providing a main power circuit, the main circuit comprising a generator, a main power transformer, and a first current interrupter;
providing an auxiliary circuit, the auxiliary circuit comprising a second current interrupter, an auxiliary transformer, and at least one auxiliary component;
coupling the main power circuit and the auxiliary circuit at a junction; and
coupling the junction to the power grid,
wherein when the main power transformer is coupled to the power grid via the first current interrupter, electrical power is provided from the generator to the power grid and to the at least one auxiliary component, and wherein when the main power transformer is isolated from the power grid by uncoupling the first current interrupter, electrical power is back fed from the power grid to the auxiliary transformer and to the at least one auxiliary component via the second current interrupter.

9. The method of claim 8, wherein the first current interrupter incorporates protective elements therein.

10. The method of claim 8, wherein the second current interrupter is one of a fused switch and a circuit breaker.

11. The method of claim 8, wherein the generator is a doubly-fed induction generator.

12. The method of claim 8, wherein the auxiliary transformer is disposed at the base of the turbine.

\* \* \* \* \*